(12) United States Patent
Czerwonatis et al.

(10) Patent No.: US 10,457,791 B2
(45) Date of Patent: Oct. 29, 2019

(54) METHOD FOR PRODUCING A SELF-ADHESIVE

(71) Applicant: TESA SE, Norderstedt (DE)

(72) Inventors: Franziska Czerwonatis, Hamburg (DE); Stephan Schönbom, Tornesch (DE); Axel Burmeister, Buchholz (DE); Volker Lass, Elmenhorst (DE)

(73) Assignee: TESA SE, Nordersedt (DE)

( * ) Notice: Subject to any disclaimer, the term of this patent is extended or adjusted under 35 U.S.C. 154(b) by 60 days.

(21) Appl. No.: 15/497,601

(22) Filed: Apr. 26, 2017

(65) Prior Publication Data

US 2017/0226308 A1    Aug. 10, 2017

Related U.S. Application Data

(63) Continuation of application No. 13/203,903, filed as application No. PCT/EP2010/053541 on Mar. 18, 2010, now abandoned.

(30) Foreign Application Priority Data

Apr. 1, 2009    (DE) .................. 10 2009 015 233

(51) Int. Cl.
| | |
|---|---|
| *B29C 44/32* | (2006.01) |
| *B29C 44/56* | (2006.01) |
| *C08J 9/32* | (2006.01) |
| *C08J 9/36* | (2006.01) |
| *C09J 133/08* | (2006.01) |
| *C09J 7/10* | (2018.01) |
| *C09J 7/38* | (2018.01) |
| *B29K 105/00* | (2006.01) |
| *B29K 33/04* | (2006.01) |
| *B29K 105/04* | (2006.01) |
| *B29K 105/24* | (2006.01) |

(52) U.S. Cl.
CPC .............. *C08J 9/32* (2013.01); *B29C 44/569* (2013.01); *C08J 9/36* (2013.01); *C09J 7/10* (2018.01); *C09J 7/38* (2018.01); *C09J 133/08* (2013.01); *B29C 44/321* (2016.11); *B29K 2033/04* (2013.01); *B29K 2105/0002* (2013.01); *B29K 2105/0076* (2013.01); *B29K 2105/0097* (2013.01); *B29K 2105/04* (2013.01); *B29K 2105/24* (2013.01); *C08J 2203/22* (2013.01); *C08J 2207/02* (2013.01); *C08J 2333/08* (2013.01); *C09J 2205/11* (2013.01)

(58) Field of Classification Search
CPC ... C08J 9/32; C08J 2203/22; C08J 9/36; C08J 2207/02; C08J 233/08; B29C 44/32; B29C 44/569; B29K 2033/04; B29K 2105/002; B29K 2105/0076; B29K 2105/0097; B29K 2105/04; B29K 2105/24; C09J 133/08; C09J 7/10; C09J 7/38

See application file for complete search history.

(56) References Cited

U.S. PATENT DOCUMENTS

| | | |
|---|---|---|
| 3,565,247 A | 2/1971 | Brochman |
| 4,456,704 A | 6/1984 | Fukumura et al. |
| 4,645,556 A | 2/1987 | Waugh et al. |
| 4,735,837 A | 4/1988 | Miyasaka et al. |
| 5,496,865 A | 3/1996 | Heese et al. |
| 2003/0138624 A1 | 7/2003 | Burmeister et al. |
| 2004/0241417 A1 | 12/2004 | Fischer et al. |
| 2008/0008831 A1 | 1/2008 | Kishimoto |
| 2008/0096988 A1 | 4/2008 | Hahn et al. |
| 2009/0048398 A1 | 2/2009 | Zollner et al. |
| 2010/0104864 A1 | 4/2010 | Zöllner et al. |

FOREIGN PATENT DOCUMENTS

| | | |
|---|---|---|
| DE | 21 05 877 C | 8/1972 |
| DE | 32 37 392 A1 | 5/1983 |
| DE | 35 37 433 A1 | 10/1986 |
| DE | 197 30 854 A1 | 1/1999 |
| DE | 10 2007 016 950 A1 | 10/2008 |
| EP | 0 257 984 A1 | 3/1988 |
| EP | 0 693 097 A1 | 1/1996 |
| EP | 1094091 A1 | 4/2001 |
| EP | 1 102 809 B1 | 5/2001 |
| JP | 2001115025 A1 | 4/2001 |
| KR | 10 2006 0038379 A | 5/2006 |
| WO | 94/22971 A1 | 10/1994 |
| WO | 95/31225 A1 | 11/1995 |
| WO | 95/32851 A1 | 12/1995 |
| WO | 98/18878 A1 | 5/1998 |
| WO | 2000/006637 A1 | 2/2000 |
| WO | 2003/011954 A1 | 2/2003 |
| WO | 2006/027387 A1 | 3/2006 |

OTHER PUBLICATIONS

T.G. Fox, "Influence of Diluent and of Copolymer Composition on the Glass Temperature of a Polymer System", Bull. Am. Phys. Soc., No. 1, p. 123, (1956).
International Search Report dated Jul. 1, 2010.
English Translation of Japanese Office Action dated Jan. 28, 2014.
Korean Office Action dated Oct. 31, 2016.

*Primary Examiner* — Melissa A Rioja
(74) *Attorney, Agent, or Firm* — Norris McLaughlin, P.A.

(57) ABSTRACT

A method for producing a foamed thermally crosslinked mass system, wherein the mass system is foamed at a first temperature in a first step, and crosslinker substances are added to the mass system in a subsequent step at a second temperature lower than the first temperature, wherein the crosslinker substances are crosslinker substances for thermal crosslinking of the mass system.

9 Claims, 2 Drawing Sheets

METHOD FOR PRODUCING A SELF-ADHESIVE

This application is a continuation of U.S. application Ser. No. 13/203,903 filed Oct. 12, 2011, now pending, which is a 371 of PCT/EP10/53541 filed Mar. 18, 2010, which claims priority of German Patent Application No. 10 2009 015 233.4 filed on Apr. 1, 2009, the contents of which are incorporated herein by reference.

The invention relates to a method for producing thermally crosslinked mass systems foamed with microballoons, more particularly self-adhesives, and also to foamed masses thus produced.

For a multiplicity of applications, foamed mass systems are important. Foams are able, for example, to perform mechanical buffering, by absorbing kinetic energy, or else to compensate unevennesses, since they can easily deform.

As a result of this, foamed mass systems are being used increasingly in adhesives processing as well. For example, in adhesive tape production, more particularly in self-adhesive tape production, it is possible for both foamed carrier materials and/or foamed (self-)adhesives to be employed. In the adhesive bonding of substrates to one another, use may then be made more particularly of the advantages specified above, the adhesive tapes being capable, for example, of compensating unevennesses in the surfaces to be bonded.

Methods for producing microballoon-foamed self-adhesives and carrier layers have been known for some considerable time.

EP 0 257 984 A1 discloses adhesive tapes which on at least one side have a foamed adhesive coating. Contained within this adhesive coating are polymer beads which in turn contain a fluid comprising hydrocarbons, and expand at elevated temperatures. The scaffold polymers of the self-adhesives may consist of rubbers or polyacrylates. The hollow microbeads here are added either before or after the polymerization. The self-adhesives comprising microballoons are processed from solvent and shaped to form adhesive tapes. The foaming step takes place consistently after coating. Accordingly, microrough surfaces are obtained. This results in properties such as, in particular, nondestructive redetachability and repositionability. The effect of the better repositionability through microrough surfaces of microballoon-foamed self-adhesives is also described in other specifications such as DE 35 37 433 A1 or WO 95/31225 A1. The microrough surface is used in order to generate a bubble-free adhesive bond. This use is also disclosed by EP 0 693 097 A1 and WO 98/18878 A1.

This described method, i.e., the processing from solvent and the expansion of the incorporated microballoons after the web-form shaping of the adhesive layer, is unsuitable, however, for the production of permanently bonding foamed adhesive systems.

The advantageous properties of the microrough surface are always opposed, therefore, by a distinct reduction in the bond strength or peel strength. DE 197 30 854 A1 therefore proposes a microballoon-foamed carrier layer which, for the purpose of preventing the loss of bond strength, proposes the use of unfoamed pressure-sensitive self-adhesives above and below a foamed core.

The carrier mixture is preferably prepared in an internal mixer typical for elastomer compounding. The mixture here is adjusted in particular to a Mooney value $ML_{1+3}$ (100° C.) in the range from 10 to 80. In a second, cold operation, possible crosslinkers, accelerators, and the desired microballoons are added to the mixture. This second operation takes place preferably at temperatures less than 70° C. in a kneading apparatus, internal mixer, roll mixer or twin-screw extruder. The mixture is subsequently calendered and/or extruded to the desired thickness on machines. The carrier is then provided on both sides with a pressure-sensitive self-adhesive. This is followed by the steps of thermal foaming and, where appropriate, crosslinking.

The microballoons may be expanded either before they are incorporated into the polymer matrix, or only after the polymer matrix has been shaped to form a carrier.

In expanded form, the casing of the microballoons has a thickness of only 0.02 μm. Accordingly, the proposed expansion of the microballoons prior to incorporation into the polymer matrix of the carrier material is disadvantageous, since in that case, as a result of the high forces during incorporation, many balloons will be destroyed and the degree of foaming, accordingly, will be reduced. Furthermore, partly damaged microballoons lead to fluctuations in thickness. A robust production operation is barely achievable. Preference is given, accordingly, to carrying out foaming after the web-form shaping in a thermal tunnel. In this case too, however, substantial deviations in the average carrier thickness from the desired thickness are a likely occurrence, owing to a lack of precisely constant conditions in the overall operation prior to foaming, and to a lack of precisely constant conditions in the thermal tunnel during foaming. Specific correction to the thickness is no longer possible. Similarly, considerable statistical deviations in the thickness must be accepted, since local deviations in the concentration of microballoons and of other carrier constituents as well are manifested directly in fluctuations in thickness.

A similar route is described by WO 95/32851 A1. There it is proposed that additional thermoplastic layers be provided between foamed carrier and self-adhesive.

Both routes do comply with the requirement for high peel strength, but also lead automatically to products having a relatively high susceptibility, since the individual layers lead to anchoring breaks under load. Furthermore, desired conformability of such products is significantly restricted, because the foamed component of a construction is necessarily reduced.

EP 1 102 809 B1 proposes a process in which the microballoons undergo partial expansion prior to exit from a coating die and, if desired, are brought to complete expansion by means of a downstream step.

This process, however, is greatly limited in terms of its function with respect to the viscosity of the mass. Highly viscous mass systems lead inevitably to a high nip pressure in the die, which compresses or deforms the expanded microballoons. Following exit from the die, the microballoons regain their original shape and puncture the surface of the adhesive. This effect is intensified by increasing viscosity of the mass, decreasing layer thickness, and falling density or rising microballoon fraction.

Microballoon-foamed (self-)adhesives or carrier layers are distinguished by a defined cell structure with a uniform distribution of foam cell sizes. They are closed-cell microfoams without cavities, as a result of which they are able to seal sensitive goods more effectively against dust and liquid media by comparison with open-cell versions.

As a result of their flexible, thermoplastic polymer shell, such foams possess greater conformity than foams filled with unexpandable, nonpolymeric hollow microbeads (hollow glass beads). They are better suited to the compensation of manufacturing tolerances of the kind which are the rule, for example, with injection moldings, and on account of their foam character they are also better able to compensate thermal stresses.

Furthermore, the mechanical properties of the foam can be influenced further by the selection of the thermoplastic resin of the polymer shell. Thus, for example, it is possible to produce foams having a higher cohesive strength than with the polymer matrix alone, even when the density of the foam is lower than that of the matrix. Hence typical foam properties such as conformability to rough substrates can be combined with a high cohesive strength for PSA foams.

Conventionally chemically or physically foamed materials, in contrast, are more susceptible to irreversible collapse under pressure and temperature. The cohesive strength here is lower as well.

DE 21 05 877 C presents an adhesive tape composed of a carrier which is coated on at least one side with a microcellular pressure-sensitive adhesive and whose adhesive layer comprises a nucleating agent, the cells of the adhesive layer being closed and being distributed completely in the adhesive layer. This adhesive tape has the ability to conform to the irregular surface to which it is applied, and hence may lead to a relatively durable adhesive bond, yet on the other hand exhibits only minimal recovery when compressed to half its original thickness. The voids in the adhesive offer starting points for the entry of solvents and water into the glueline from the side, which is highly undesirable. Furthermore, it is impossible to rule out the complete penetration of solvents or water through the entire adhesive tape.

A disadvantage of the methods known from the prior art is that thermally sensitive materials or substances, more particularly those which have a decomposition temperature or reaction temperature that lies below the expansion temperature of the microballoons, cannot be processed, since these substances would undergo decomposition during the expansion procedure or would react in an uncontrolled way during the expansion procedure.

It is an object of the invention to overcome the disadvantages of the prior art and more particularly to provide a method that allows thermally sensitive substances to be incorporated into a foamed pressure-sensitive adhesive, preferably without thereby adversely affecting the degree of foaming.

The invention is achieved by means of a method in which the mass system is first foamed in a first step at a first temperature, and the thermally sensitive substances are added to the mass system in a following step at a second, lower temperature than the first temperature.

The mass system is advantageously foamed in a first step, more particularly through expansion of microballoons at the temperature necessary for that purpose, and the thermally sensitive substances are to be admixed only in a following method step at a lower temperature, thus more particularly a temperature which lies below the expansion temperature of the microballoons, especially advantageously at a temperature which is not critical for the thermally sensitive substances.

In this respect it is advantageous, in particular, if the first temperature, at which the mass system is foamed, corresponds to or lies above the expansion temperature of the microballoons, and if the second temperature, at which the thermally sensitive substances are added to the mass system, lies below the expansion temperature of the microballoons.

The procedure according to the invention is also suitable for substances of great thermal sensitivity. If cooling to a lower temperature does not produce a temperature which is already not critical for the thermal substances, then the time from the addition of the thermally sensitive substances until the shaping of the mass system can be minimized, however, and so secondary reactions, decomposition of the thermally sensitive substances or other kinds of unwanted reactions of these substances can be reduced to a minimum. As a result of the method of the invention, it is possible to prevent the thermally sensitive substances being subjected to the method step of microballoon expansion and to the temperature conditions that are required for such expansion.

To the skilled person it was surprising and unforeseeable that in the second mixing assembly there is no loss of foaming rate on cooling of the foam and on addition of the further substances. The cooling causes an increase in the viscosity of the mass system, and so, in the case of processing in a mixing assembly, an increased shear is likely. In accordance with expectation, the processing of foamed mass systems in mixing assemblies therefore leads, in the case of foamed mass systems at low temperatures, to "destructive beating" of the foam and hence to a significant decrease in the degree of foaming.

It has emerged, surprisingly, that microballoon-foamed mass systems are good at withstanding processing after cooling in a system in which the mass is subject to shearing, more particularly in a mixing assembly. As a result, it has been made possible to admix heat-sensitive additives in a method step downstream of the foaming operation, without any significant decrease in the degree of foaming.

In accordance with the invention it is possible to perform the cooling of the mass system and the admixing of the heat-sensitive substances in the same mixing assembly in which the mixing of the mass system with the as yet unexpanded microballoons has already been carried out.

The method of the invention opens up a route allowing foamed mass systems—that is, systems after the expansion of the microballoons as well—to be processed further. In other words, in particular, additional thermally sensitive adjuvants, fillers or additives, such as fragrances or crosslinker components, for example, can be incorporated, without destroying the expanded microballoons present in the polymer matrix.

With the method of the invention, success has been achieved in particular in opening up access for thermal crosslinking to foamed mass systems such as foamed self-adhesives, for example, where the foaming is realized by means of supply of thermal energy, without the mass system undergoing uncontrolled crosslinking in the process. Accordingly, therefore, it is possible to uncouple the expansion procedure from the crosslinking operation. In other words, the choice of the crosslinking system can be made completely independently of the choice of the type of microballoon to be expanded, and vice versa.

Microballoons

Microballoons are elastic hollow spheres which have a thermoplastic polymer casing. These spheres are filled with low-boiling liquids or with liquefied gas. Casing materials used are, in particular, polyacrylonitrile, PVDC, PVC or polyacrylates. Suitable low-boiling liquids are, in particular, hydrocarbons of the lower alkanes, for example isobutane or isopentane, which are enclosed as liquefied gas under pressure in the polymer casing.

The exposing of the microballoons, more particularly their exposure to heat, has the effect on the one hand of softening the outer polymer casing. At the same time, the liquid propellant gas within the casing converts to its gaseous state. Here, the microballoons undergo irreversible extension and expand three-dimensionally. The expansion is at an end when the internal pressure and the external pressure compensate one another. Since the polymeric casing is retained, the result is a closed-cell foam.

A multiplicity of types of microballoon are available commercially, such as, for example, from the company Akzo Nobel, the Expancel DU products (dry unexpanded), which differ essentially in their size (6 to 45 µm in diameter in the unexpanded state) and in the initiation temperature they require for expansion (75 to 220° C.). When the type of microballoon or the foaming temperature has been harmonized with the temperature profile required for the compounding of the mass, and with the machine parameters, it is also possible for mass compounding and foaming to take place simultaneously in one step.

Furthermore, unexpanded microballoon products are also available in the form of an aqueous dispersion having a solids fraction or microballoon fraction of approximately 40% to 45% by weight, and also, furthermore, in the form of polymer-bound microballoons (masterbatches), for example in ethyl-vinyl acetate, with a microballoon concentration of approximately 65% by weight. Not only the microballoon dispersions but also the masterbatches are suitable, like the DU products, for the foaming of adhesives in accordance with the method of the invention.

Mass Base

The mass system is with particular preference a polymeric system of a kind which can be used as an adhesive, especially advantageously as a self-adhesive or pressure-sensitive adhesive.

With the method of the invention it is possible in principle to carry out solvent-free processing of all existing adhesives components that are described in the literature, more particularly those of self-adhesives.

The selection of a suitable adhesive base for the implementation of the method of the invention is not critical. It may be selected from the group of thermoplastic elastomers constituting natural rubbers and synthetic rubbers, including block copolymers and blends thereof, or else from the group of the polyacrylate adhesives, as they are called.

Adhesives used may additionally be based on polyurethane, silicone rubbers and/or polyolefins.

In accordance with the invention it is also possible to employ mixed systems of adhesives having different bases (blends based on two or more of the following chemical classes of compound: natural rubbers and synthetic rubbers, polyacrylates, polyurethanes, silicone rubbers, polyolefins and/or others; and/or copolymers of the corresponding monomers of the above polymer classes, and/or further monomers).

The base for the rubber-based adhesives is advantageously a nonthermoplastic elastomer selected from the group of natural rubbers or synthetic rubbers, or it is composed of any desired blend of natural rubbers and/or synthetic rubbers, the natural rubber or rubbers being selectable in principle from all available grades such as, for example, crepe, RSS, ADS, TSR or CV products, depending on required purity and viscosity, and the synthetic rubber or synthetic rubbers being selectable from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes, and/or blends thereof.

With further preference it is possible to select thermoplastic elastomers as a base for the adhesive.

As representatives, mention may be made at this point of the styrene block copolymers and especially of the styrene-isoprene-styrene (SIS) and styrene-butadiene-styrene (SBS) products.

With further preference, the adhesive may also be selected from the group of polyacrylates.

It is advantageous in this case if at least a portion of the monomers have functional groups which are able to react in a thermal crosslinking reaction and/or which promote a thermal crosslinking reaction.

For the method of the invention it is preferred to use a polyacrylate which on the following reactant mixture, comprising, in particular, softening monomers, additionally monomers with functional groups capable of entering into reactions with the crosslinker substances or with some of the crosslinker substances, more particularly addition reactions and/or substitution reactions, and also, optionally, further copolymerizable comonomers, more particularly hardening monomers. The nature of the polyacrylate to be prepared (pressure-sensitive adhesive; heat-sealing composition, viscoelastic nontacky material, and the like) may be influenced in particular via a variation in the glass transition temperature of the polymer, through different weight fractions of the individual monomers.

For purely crystalline systems there is a thermal equilibrium between crystal and liquid at the melting point $T_m$. Amorphous or partially crystalline systems, in contrast, are characterized by the transformation of the more or less hard amorphous or partially crystalline phase into a softer (rubberlike to viscous) phase. At the glass point, particularly in the case of polymeric systems, there is a "thawing" (or "freezing" in the case of cooling) of the Brownian molecular motion of relatively long chain segments. The transition from the melting point $T_m$ (also "melting temperature"; really defined only for purely crystalline systems; "polymer crystals") to the glass transition point $T_g$ (also "glass transition temperature", "glass temperature") can therefore be considered to be a fluid transition, depending on the proportion of the partial crystallinity of the sample under analysis.

In the sense of the remarks above, when the glass point is stated, the reference for the purposes of this specification includes the melting point as well—in other words, the glass transition point (or else, synonymously, the glass transition temperature) is also understood to include the melting point for the corresponding "melting" systems. The statements of the glass transition temperatures relate to the determination by means of dynamic mechanical analysis (DMA) at low frequencies.

In order to obtain polymers, as for example pressure-sensitive adhesives or heat-sealing compositions, having desired glass transition temperatures, the quantitative composition of the monomer mixture is advantageously selected such that, in accordance with an equation (E1) in analogy to the Fox equation (cf. T. G. Fox, Bull. Am. Phys. Soc. 1 (1956) 123), the desired $T_g$ value for the polymer is produced.

$$\frac{1}{T_g} = \sum_n \frac{W_n}{T_{g,n}} \quad (E1)$$

In this equation, n represents the serial number of the monomers used, $W_n$ represents the mass fraction of the respective monomer n (% by weight), and $T_{g,n}$ represents the respective glass transition temperature of the homopolymer of each of the monomers n, in K.

It is preferred to use a polyacrylate which can be traced back to the following monomer composition:

a) acrylic and/or methacrylic esters of the following formula where $R^I$=H or $CH_3$ and $R^{II}$ is an alkyl radical having 4 to 14 C atoms, b) olefinically unsaturated monomers having functional groups of the type already defined for reactivity with crosslinker substances or some of the crosslinker substances, c) optionally further acrylates and/or methacrylates and/or olefinically unsaturated monomers which are copolymerizable with component (a).

For the use of the polyacrylate as a pressure-sensitive adhesive (PSA), the fractions of the corresponding components (a), (b), and (c) are selected such that the polymerization product more particularly has a glass transition temperature 15° C. (DMA at low frequencies).

For the preparation of PSAs it is very advantageous to select the monomers of component (a) with a fraction from 45% to 99% by weight, the monomers of component (b) with a fraction from 1% to 15% by weight, and the monomers of component (c) with a fraction from 0% to 40% by weight (the figures are based on the monomer mixture for the "base polymer", i.e., without additions of any additives to the completed polymer, such as resins etc.).

For the application of a hotmelt adhesive, in other words of a material which acquires its pressure-sensitive tack only by virtue of heating, the fractions of the corresponding components (a), (b), and (c) are selected more particularly such that the copolymer has a glass transition temperature ($T_g$) of between 15° C. and 100° C., preferably between 30° C. and 80° C., more preferably between 40° C. and 60° C. The fractions of components (a), (b), and (c) should be selected accordingly.

A viscoelastic material, which, for example, may typically be laminated on both sides with pressure-sensitive adhesive layers, has a glass transition temperature ($T_g$) in particular of between −50° C. to +100° C., preferably between −20° C. to +60° C., more preferably 0° C. to 40° C. Here again, the fractions of components (a), (b), and (c) should be selected accordingly.

The monomers of component (a) are, in particular, softening and/or apolar monomers. For the monomers (a) it is preferred to use acrylic monomers which comprise acrylic and methacrylic esters with alkyl groups consisting of 4 to 14 C atoms, preferably 4 to 9 C atoms. Examples of monomers of this kind are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate, 2-ethylhexyl methacrylate, for example.

The monomers of component (b) are, in particular, olefinically unsaturated monomers (b) having functional groups, in particular having functional groups which are able to enter into a reaction with the epoxide groups.

Preference for component (b) is given to using monomers having those functional groups which are selected from the following listing: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

For the purposes of component (c) it is possible in principle to use all compounds with vinylic functionalization which are copolymerizable with component (a) and/or component (b), and which may also serve to adjust the properties of the resultant PSA.

Monomers named by way of example for component (c) are as follows:

methyl acrylate, ethyl acrylate, propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, t-butylphenyl acrylate, t-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenyl acrylate, 4-biphenyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxyacrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethylacrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,3,4,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8-pentacafluorooctyl methacrylate, dimethylaminopropylacrylamide, dimethylaminopropylmethacrylamide, N-(1-methyl-undecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, a- and p-methylstyrene, a-butylstyrene, 4-n-butylstyrene, 4-n-decylstyrene, 3,4-dimethoxystyrene, macromonomers such as 2-polystyreneethyl methacrylate (molecular weight Mw from 4000 to 13 000 g/mol), poly(methyl methacrylate)-ethyl methacrylate (Mw from 2000 to 8000 g/mol).

Monomers of component (c) may advantageously also be selected such that they contain functional groups which support subsequent radiation crosslinking (by electron beams, UV, for example). Suitable copolymerizable photoinitiators are, for example, benzoin acrylate and acrylate-functionalized benzophenone derivatives. Monomers which support crosslinking by electron irradiation are, for example, tetrahydrofurfuryl acrylate, N-tert-butylacrylamide, and allyl acrylate, this enumeration not being conclusive.

The mass system may further be selected such that it may be used as a carrier layer—more particularly for an adhesive tape. The above remarks relating to the chemical nature apply analogously for this purpose, although a carrier layer of this kind need not necessarily have adhesive or self-adhesive properties (though of course it may do so).

Additives

As tackifying resins it is possible without exception to use all tackifier resins already known and described in the literature. Representatives that may be stated are the rosins, their disproportionated, hydrogenated, polymerized, and esterified derivatives and salts, the aliphatic and aromatic hydrocarbon resins, terpene resins and terpene-phenolic resins. Any desired combinations of these and additional resins may be used in order to adjust the properties of the resultant adhesive in accordance with requirements.

As plasticizers it is possible to use all of the plasticizing substances known from adhesive tape technology. These include, among others, the paraffinic and naphthenic oils, (functionalized) oligomers such as oligobutadienes, oligoisoprenes, liquid nitrile rubbers, liquid terpene resins, vegetable and animal oils and fats, phthalates, functionalized acrylates, low molecular mass polyacrylates, water-soluble plasticizers, plasticizing resins, phosphates, polyphosphates, and citrates.

Optionally it is also possible to add powder- and granule-form fillers, dyes, and pigments, including, in particular, abrasive and reinforcing types, such as, for example chalks ($CaCO_3$), titanium dioxides, zinc oxides, and carbon blacks. With great preference it is possible to use various forms of chalk as a filler, and Mikrösohl chalk is employed with particular preference.

It is also possible for low-flammability fillers, such as, for example, ammonium polyphosphate, and also electrically conductive fillers (such as, for example, conductive carbon black, carbon fibers and/or silver-coated beads), and also thermally conductive materials (such as, for example, boron nitride, aluminum oxide, silicon carbide), and also ferromagnetic additives (such as, for example, iron(III) oxides), and also additives for volume increase, especially for producing foamed layers (such as, for example, expandants, solid glass beads, hollow glass beads, microbeads made of other materials, silica, silicates, organically renewable raw materials, for example sawdust, organic and/or inorganic nanoparticles, fibers), and also aging inhibitors, light stabilizers, ozone protectants, compounding agents and/or expandants, to be added or compounded in. As aging inhibitors it is possible with preference for primary aging inhibitors, e.g., 4-methoxyphenol, and secondary aging inhibitors, e.g., Irgafos® TNPP from Ciba Geigy, to be used, either alone or in combination with one another. Reference is to be made only at this point here to further corresponding Irganox® products from Ciba Geigy and Hostano® from Clariant. As further outstanding agents against aging it is possible to use phenothiazine (C-radical scavenger) and also hydroquinone methyl ether in the presence of oxygen, and also oxygen itself.

Thermally Sensitive Substances

Thermally sensitive substances may be, for example, crosslinker substances and/or crosslinker accelerator substances that are to be used for thermal crosslinking of the mass system (the adhesive or pressure-sensitive adhesive). At the temperatures of the kind needed for expansion of the microballoons, such substances would already result in an uncontrollable crosslinking reaction ("gelling") in the mixing assembly—depending on the degree of uncontrollable crosslinking, such reaction may lead to sporadic aggregation or even complete caking. In that case, shaping of the mass system, more particularly its uniform and homogeneous coating, as is important for adhesives and PSAs, can no longer be carried out, and with too high a degree of crosslinking, the mass system loses any suitability as a pressure-sensitive adhesive or self-adhesive.

Thermally sensitive substances may also, for example, be colorants or fragrances, especially those which at elevated temperatures undergo decomposition or otherwise lose their coloring or fragrancing properties, respectively.

It is also possible for the crosslinker system to be composed of thermally sensitive and thermally insensitive components; for example, the crosslinkers themselves may be thermally insensitive, but the crosslinker accelerators may be thermally sensitive, or vice versa. It is also possible, for the purpose of the thermally induced chemical crosslinking, in the method according to the invention, for all existing thermally activatable chemical crosslinkers such as accelerated sulfur systems or sulfur donor systems, isocyanate systems, reactive melamine resins, formaldehyde resins and (optionally halogenated) phenol-formaldehyde resins and/or reactive phenolic-resin or diisocyanate crosslinking systems, with the corresponding activators, or epoxidized polyester resins and acrylate resins, and also combinations thereof, to be employed.

The crosslinkers are advantageously crosslinkers which are activatable at temperatures above 50° C., more particularly at temperatures of 100° C. to 160° C., very preferably at temperatures of 110° C. to 140° C.

The thermal excitation of the crosslinkers may take place, for example, by in-process heat (active heating, heat of shearing), IR radiation or high-energy alternating fields.

In one very advantageous embodiment, the added thermal crosslinker is an isocyanate, preferably a trimerized isocyanate. With particular preference, the trimerized isocyanates are aliphatic isocyanates and/or isocyanates that are deactivated with amines. Examples of suitable isocyanates include trimerized derivatives of MDI [4,4-methylenedi(phenyl isocyanate)], HDI [1,6-hexylene diisocyanate] and/or IPDI [isophorone diisocyanate, 5-isocyanato-1-isocyanatomethyl-1,3,3-trimethylcyclohexane] and also—especially trimerized—polyisocyanates and/or polyfunctional isocyanates and/or polyfunctional polyisocyanates.

Reference may be made here in particular to thermal crosslinkers which are emphasized as being advantageous in WO 2006/027387 A1.

Additionally, and very advantageously, it is possible to use a crosslinker-accelerator system for the thermal crosslinking particularly of polyacrylates, comprising at least one substance containing epoxide groups—as crosslinker—and at least one substance ("accelerator") which has an accelerating effect on the linking reaction at a temperature below the melting temperature of the polyacrylate, more particularly at room temperature; polyfunctional amines especially. The crosslinker-accelerator system is used in particular in the presence of functional groups in the building blocks of the mass that are able to enter into a linking reaction with epoxide groups, particularly in the form of an addition or substitution reaction. In the course of the thermal crosslinking, therefore, there is preferably linking of the building blocks that carry the functional groups with the building blocks that carry the epoxide groups (more particularly in the sense of a crosslinking of the corresponding polymer building blocks carrying the functional groups, by way of the substances carrying the epoxide groups, as linking bridges). Substance having an accelerating effect means that the substance supports the crosslinking reaction insofar as it ensures an inventively sufficient reaction rate, whereas the crosslinking reaction in the absence of the accelerator, with selected reaction parameters, here more particularly a temperature which lies below the melting temperature of the polyacrylates, would not proceed at all or would proceed only with insufficient slowness. The accelerator, then, ensures a substantial improvement in the kinetics of the crosslinking reaction. This may take place catalytically, in accordance with the invention, or else by coupling into the reaction event.

Reference may be made in particular to crosslinker-accelerator systems as presented in DE 10 2007 016 950 A1.

Carrier

As carrier material for the single-sided or double-sided adhesive tape it is possible to use all known textile carriers such as a loop product or a velour, scrim, woven fabric or knitted fabric, more particularly a woven PET filament fabric or a woven polyamide fabric, or a nonwoven web; the term "web" embraces at least textile fabrics according to EN 29092 (1988) and also stitchbonded nonwovens and similar systems.

It is likewise possible to use spacer fabrics, including wovens and knits, with lamination. Spacer fabrics are mat-like layer structures having a cover layer composed of a fiber or filament fleece, an underlayer, and individual retaining fibers or bundles of such fibers between these layers, the said fibers being distributed over the area of the layer structure, being needled through the particle layer, and joining the cover layer and the underlayer to one another. The retaining fibers that are needled through the particle layer hold the cover layer and the underlayer at a distance from one another and are joined to the cover layer and the underlayer.

Suitable nonwovens include, in particular, consolidated staple fiber webs, but also filament webs, meltblown webs and spunbonded webs, which generally require additional consolidation. Known, possible consolidation methods for webs are mechanical, thermal and chemical consolidation. Whereas with mechanical consolidations the fibers are held together purely mechanically, usually by entanglement of the individual fibers, by the interleafing of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose, open structure in the web.

Webs which have proved to be particularly advantageous are those consolidated more particularly by overstitching with separate threads or by interlooping.

Consolidated webs of this kind are produced, for example, on stitchbonding machines of the "Malifleece" type from the company Karl Mayer, formerly Malimo, and can be obtained from companies including Naue Fasertechnik and Techtex GmbH. A Malifleece is characterized in that a cross-laid web is consolidated by the formation of loops from fibers of the web.

The carrier used may also be a web of the Kunit or Multiknit type. A Kunit web is characterized in that it originates from the processing of a longitudinally oriented fiber web to produce a fabric which has loops on one side and on the other has loop feeds or pile fiber folds, but possesses neither threads nor prefabricated fabrics. A web of this kind as well has been produced for a relatively long time on, for example, stitchbonding machines of the "Kunitvlies" type from the company Karl Mayer. A further characterizing feature of this web is that, as a longitudinal fiber web, it is able to accommodate high tensile forces in the longitudinal direction. The characteristic feature of a Multiknit web relative to the Kunit web is that the web is consolidated on both the top and bottom sides by virtue of the double-sided needle punching.

Finally, stitchbonded webs are also suitable as an intermediate for forming an adhesive tape of the invention. A stitchbonded web is formed from a nonwoven material having a multiplicity of stitches extending parallel to one another. These stitches come about through the incorporation, by stitching or knitting, of continuous textile threads. For this type of web, stitchbonding machines of the "Maliwatt" type are known from the company Karl Mayer, formerly Malimo.

And then the Caliweb® is outstandingly suitable. The Caliweb® consists of a thermally fixed Multiknit spacer web with two outer mesh layers and an inner pile layer which is disposed perpendicular to the mesh layers.

Also particularly advantageous is a staple fiber web which is mechanically preconsolidated in the first step or is a wet-lay web laid hydrodynamically, in which between 2% and 50% of the web fibers are fusible fibers, more particularly between 5% and 40% of the fibers of the web.

A web of this kind is characterized in that the fibers are laid wet or, for example, a staple fiber web is preconsolidated by the formation of loops from fibers of the web or by needling, stitching or air-jet and/or water-jet treatment.

In a second step, thermofixing takes place, with the strength of the web being increased again by the melting-on or partial melting of the fusible fibers.

The web carrier may also be consolidated without binders, by means, for example, of hot embossing with structured rollers, in which case pressure, temperature, dwell time and the embossing geometry can be used to control properties such as strength, thickness, density, flexibility and the like.

Starting materials envisaged for the textile carriers include, more particularly, polyester fibers, polypropylene fibers, viscose fibers or cotton fibers. The present invention, though, is not restricted to the materials stated; instead it is possible to use a multiplicity of other fibers to produce the web, this being evident to the skilled person without any need for inventive activity. Use is made more particularly of wear-resistant polymers such as polyesters, polyolefins or polyamides or fibers of glass or of carbon.

Also suitable as carrier material are carriers made of paper (creped and/or uncreped), of a laminate, of a film (for example polyethylene, polypropylene or monoaxially or biaxially oriented polypropylene films, polyester, PA, PVC and other films) or of foam materials in web form (made of polyethylene and polyurethane, for example).

On the coating side it is possible for the surfaces of the carriers to have been chemically or physically pretreated, and also for their reverse side to have undergone an anti-adhesive physical treatment or coating.

Finally, the weblike carrier material may be a double-sidedly anti-adhesively coated material such as a release paper or a release film, also called a liner.

Method

The introduction of the expandable, but as yet unexpanded, microballoons into the mass system may be accomplished in particular by mixing the microballoons with the other constituents needed to form the mass system (these are, more particularly, the polymers and, optionally, resins and/or fillers). Alternatively the microballoons can be added to the already melted mass system.

In this phase of the method—especially when the sensitive substances are thermal crosslinkers or include or constitute a thermal crosslinker system—it is possible to add components—more particularly, this very same crosslinker system—which do not yet react thermally in this phase, because, for example, a further component of the system is not yet present here. It is possible, accordingly, in this phase already to add crosslinkers which only undergo substantial reaction in the presence of accelerator substances.

It is of advantage, particularly when adding thermal crosslinkers or a thermal crosslinker system, if the mass system on addition of the thermally crosslinked substances is present in a noncrosslinked state or in a state only of very slight crosslinking. By this means, effective shaping of the mass is possible.

Suitable mixing assemblies include, in particular, continuously operating mixing assemblies, such as a planetary roller extruder, for example.

In this extruder, the components for producing the mass system can be introduced and, in particular, melted. In accordance with the invention it is possible to introduce pre-prepared, solvent-free mass into the slurrying assembly, more particularly the planetary roller extruder, by means of injection, through conveying extruders, such as single-screw extruders, for example, or through a drum melt, and to meter the microballoons into this initially introduced system in the intake zone of the planetary roller extruder.

Microballoon foamed masses do not in general need to be degassed prior to coating, in order to obtain a uniform, continuous coating pattern. The expanded microballoons displace the air included in the adhesive in the course of compounding. In the case of high throughputs, however, it is still advisable to degas the masses prior to coating, in order to obtain a uniform reservoir of mass in the roll nip. Degassing is ideally accomplished immediately ahead of the roll applicator, at mixing temperature and under a pressure difference from ambient pressure of at least 200 mbar.

In accordance with the invention it is possible for the cooling of the mass system following expansion of the microballoons, and the admixing of the heat-sensitive substances, to be performed in the same mixing assembly in which the mixing of the mass system with the as yet unexpanded microballoons has already been carried out. In accordance with the invention, however, this operation may also take place in a second mixing assembly.

The blended mass system may be shaped in particular to form a layer, and with particular advantage this step takes place in a roll applicator. In principle, however, foamed bodies of different forms may also be shaped.

For the case in particular where the mass system is a (self-)adhesive, it is possible in this way to produce (self-)adhesive tapes. It is particularly advantageous for this purpose if the (self-)adhesive is applied to a web-form carrier or release material.

The mass system, foamed and provided with thermally sensitive substances, is thermally crosslinked in an advantageous procedure; especially when the thermally sensitives are thermal crosslinkers and/or accelerators or constitute a thermal crosslinker system or comprise the aforesaid components. Thermal crosslinking may advantageously, in particular, take place after the operation of shaping to form the layer, more particularly on a carrier or release material.

The method of the invention is elucidated in more detail below with reference to two advantageous variant embodiments, without any intention to impose any unnecessary restriction through the choice of the method variants depicted.

A first very advantageous procedure is characterized by a method sequence (cf. also FIG. 1) in which
- in a first mixing assembly, first of all, expandable microballoons—and optionally further additives—are introduced into a mass system;
- the mass system with the microballoons added is heated—more particularly under superatmospheric pressure—to a temperature which at least corresponds to, and is advantageously higher than, the expansion temperature of the microballoons under atmospheric pressure,
- the microballoons are expanded in particular on emergence from the first mixing assembly,
- the mass system is introduced into a second mixing assembly, and so in this second mixing assembly the mass system is at a temperature which lies below the expansion temperature of the microballoons,
- the thermally sensitive substances are added in the second mixing assembly,
- the mass system thus blended is shaped.

Figure 1:
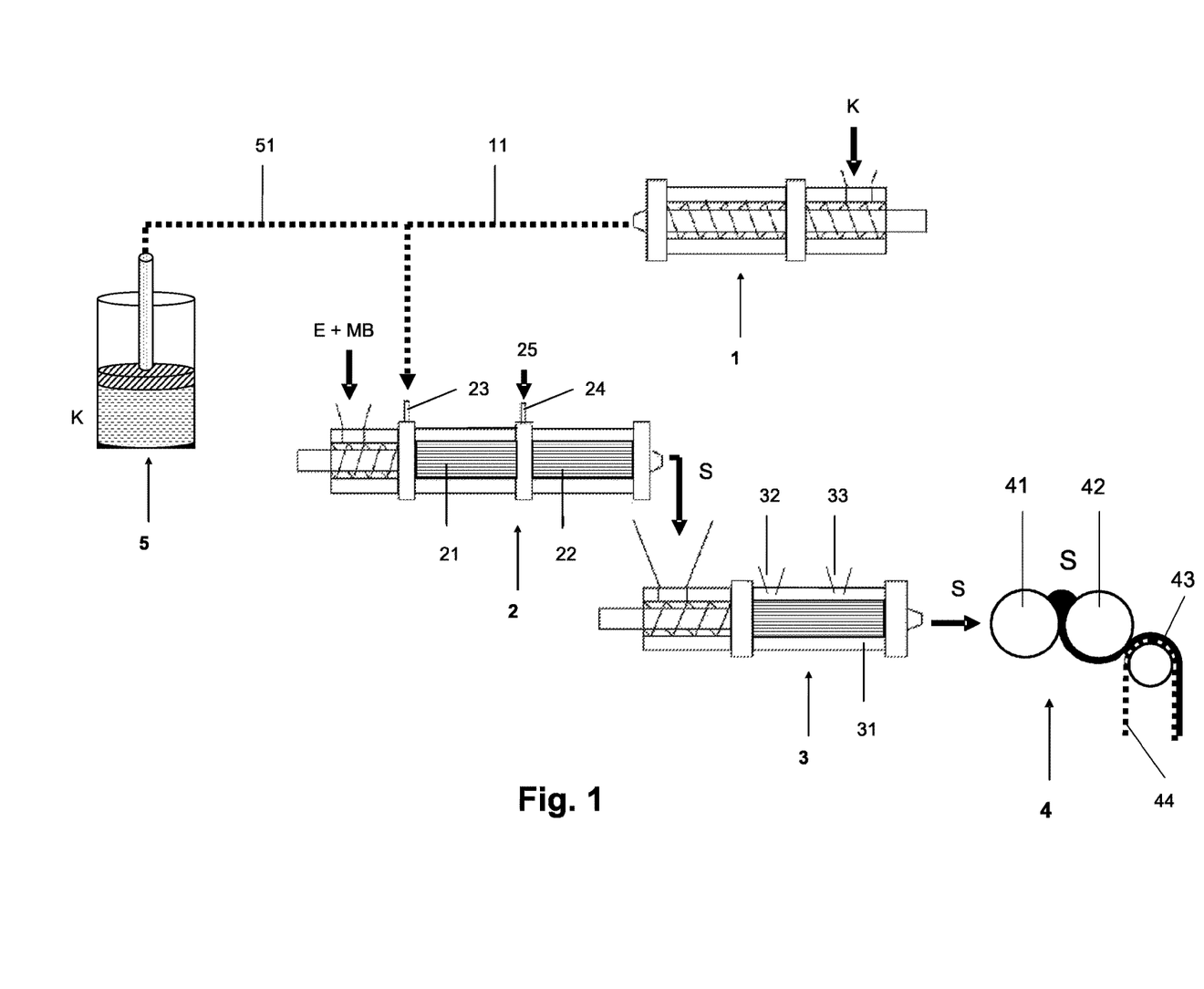
FIG. 1 shows the method with two mixing assemblies, the expansion of the microballoons taking place in the first mixing assembly followed by addition of thermally sensitive additives or fillers in the second mixing assembly

The cooling of the mass system to a temperature below the expansion temperature of the microballoons takes place in this case during the transfer of the mass system to the second mixing assembly and/or following its transfer to the second mixing assembly. Accordingly, the addition of the sensitive substances takes place during and/or after the cooling of the mass system, more particularly after its cooling.

A further very advantageous procedure is characterized by a method sequence (cf. also FIG. 2) in which
- in a first mixing assembly, first of all, expandable microballoons—and optionally further additives—are introduced into a mass system;
- the mass system with the microballoons added is heated—more particularly under superatmospheric pressure—in a first mixing zone of the mixing assembly to a temperature which at least corresponds to, and is advantageously higher than, the expansion temperature of the microballoons under atmospheric pressure,
- the mass system is subsequently transferred from the first mixing zone into a second mixing zone of the first mixing assembly, and so in this second mixing zone the mass system is at a temperature which lies below the expansion temperature of the microballoons,
- the thermally sensitive substances are added during transfer of the mass system to the second mixing zone and/or after transfer to the second mixing zone,
- the mass system thus blended is shaped.

Figure 2:
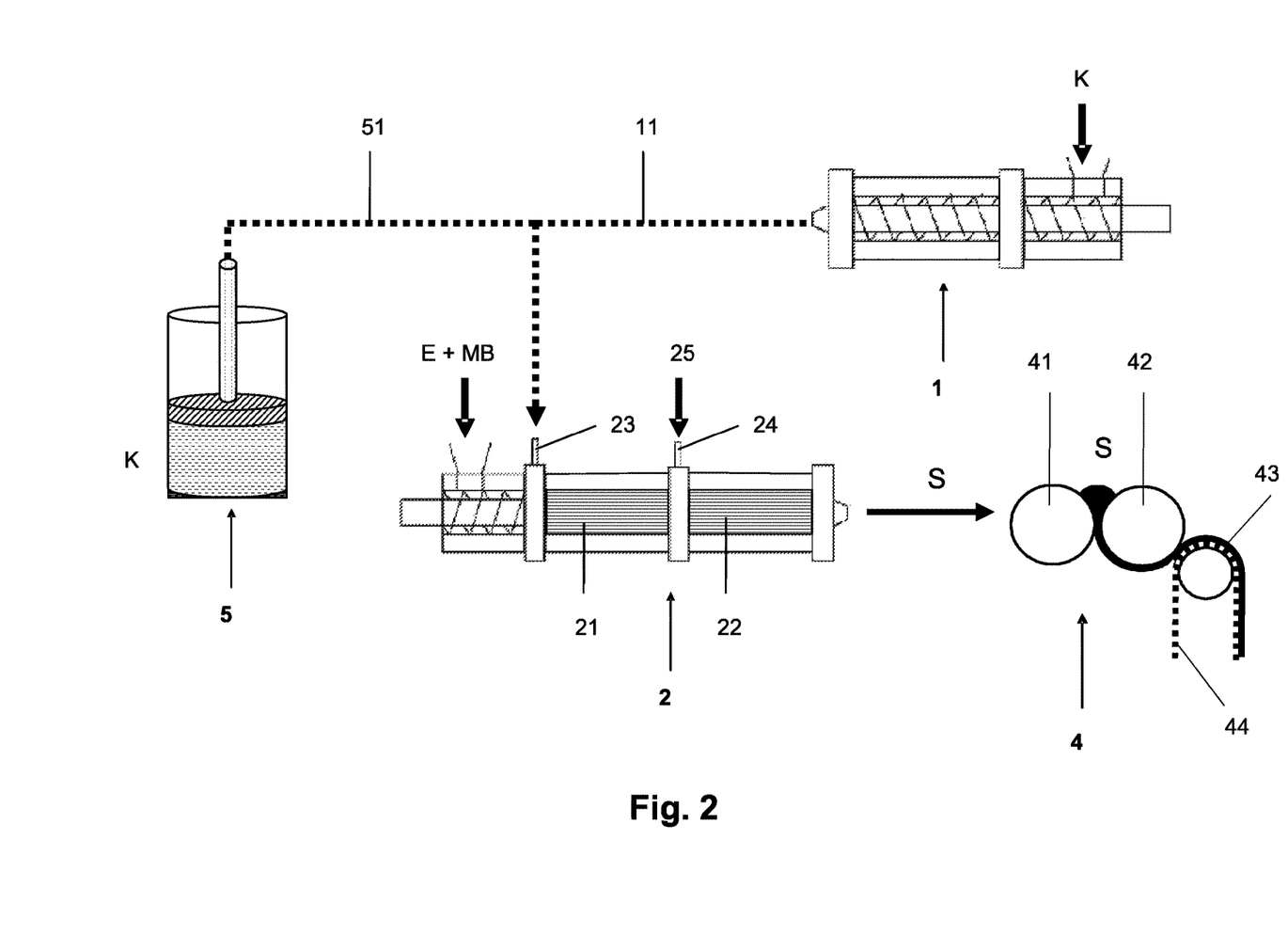
FIG. 2 shows the method with one mixing assembly, the expansion of the microballoons and the addition of thermally sensitive additives or fillers taking place in one mixing assembly.

The cooling of the mass system to a temperature below the expansion temperature of the microballoons takes place in this case during the transfer of the mass system to the second mixing zone and/or after its transfer to the second mixing zone. Accordingly, the addition of the sensitive substances takes place during and/or after the cooling of the mass system, more particularly after its cooling.

Below, the methods described above that lie within the concept of the invention are illustrated in particularly outstandingly embodied variants, without any intention to impose any unnecessary restriction through the choice of the figures shown.

FIG. 1 shows one particularly advantageously embodied method for producing a foamed mass system.

The reactants E which are intended to form the mass system to be foamed, and the microballoons MB, are fed to a continuous mixing assembly, such as a planetary roller extruder (PWE) 2, for example.

Another possibility, however, is to introduce pre-prepared solvent-free mass K into the planetary roller extruder (PWE) 2 by means of injection 23 through conveying extruders, such as a single-screw extruder (ESE) 1, for example, or through a drum melt 5, and to meter in the microballoons MB in the intake zone of the PWE 2.

The microballoons MB are then mixed with the solvent-free mass K or with the reactants E to form a homogeneous mass system in the PWE 2, and this mixture is heated, in the first heating and mixing zone 21 of the PWE 2, to the temperature necessary for the expansion of the microballoons.

In the second injection ring 24, further additives or fillers 25, such as crosslinking promoters, for example, may be added to the mass system S comprising expanded microballoons.

In order to be able to incorporate thermally sensitive additives or fillers 25, the injection ring 24 and the second heating and mixing zone 22 are preferably cooled.

The foamed mass system is subsequently transferred to a further continuous mixing assembly, such as a twin-screw extruder (DSE) 3, for example, and can then be blended with further fillers or additives, such as crosslinking components, such as catalysts, for example, at moderate temperatures, without destroying the expanded microballoons MB.

The microballoons MB break through the surface of the mass at the die exit of DSE 3, as they also did before at the die exit of PWE 2.

With a roll applicator 4, this foamlike mass S is calendered and coated onto a web-form carrier material 44 such as release paper, for example; in some cases there may also be subsequent foaming in the roll nip. The roll applicator 4 is composed of a doctor blade roll 41 and a coating roll 42. The release paper 44 is guided to the latter roll via a pick-up roll 43, and so the release paper 44 takes the foamed mass S from the coating roll 42. At the same time, the expanded microballoons MB are pressed again into the polymer matrix of the foamed mass S, thereby producing a smooth and, in the case of the foaming of self-adhesives, a permanently (irreversibly) adhesive surface, with very low densities of up to 150 kg/m$^3$.

FIG. 2 shows a further particularly advantageously embodied method for producing a foamed mass system.

The reactants E and the microballoons MB, which are intended to form the mass system to be foamed, are fed to a continuous mixing assembly, such as a planetary roller extruder (PWE) 2, for example.

Another possibility, however, is to introduce pre-prepared solvent-free mass K into the planetary roller extruder (PWE) 2 by means of injection 23 through conveying extruders, such as a single-screw extruder (ESE) 1, for example, or through a drum melt 5, and to meter in the microballoons MB in the intake zone of the PWE 2.

The microballoons MB are then mixed with the solvent-free mass K or with the reactants E to form a homogeneous mass system in the PWE 2, and this mixture is heated, in the first heating and mixing zone 21 of the PWE 2, to the temperature necessary for the expansion of the microballoons.

In the second injection ring 24, further additives or fillers 25, such as crosslinking promoters, for example, may be added to the mass system S comprising expanded microballoons.

In order to be able to incorporate thermally sensitive additives or fillers 25, the injection ring 24 and the second heating and mixing zone 22 are cooled.

The expanded microballoons MB break through the surface of the mass at the die exit of the PWE 2.

With a roll applicator 4, this foamlike mass S is calendered and coated onto a web-form carrier material 44 such as release paper, for example; in some cases there may also be subsequent foaming in the roll nip. The roll applicator 4 is composed of a doctor blade roll 41 and a coating roll 42. The release paper 44 is guided to the latter roll via a pick-up roll 43, and so the release paper 44 takes the foamed mass S from the coating roll 42.

At the same time, the expanded microballoons MB are pressed again into the polymer matrix of the foamed mass S, thereby producing a smooth and, in the case of the foaming of self-adhesives, a permanently (irreversibly) adhesive surface, with very low densities of up to 150 kg/m$^3$.

Adhesive/Adhesive Tape

The invention also provides an adhesive, more particularly self-adhesive, obtained by the method of the invention. The invention more particularly provides a thermally crosslinked, microballoon-foamed adhesive, more particularly self-adhesive.

The benefit of foamed adhesives lies on the one hand in cost reduction. A saving can be made on raw materials, since coat weights can be reduced by a multiple for given layer thicknesses. For a given throughput or quantity production of adhesive, in addition, the coating speeds can be increased.

An advantage of thermal crosslinking is that it produces an adhesive which has no crosslinking profile—in particular, therefore, in the case of layers of adhesive, no crosslinking profile through the layer. In the case of crosslinking by actinic radiation, such a profile is always formed to a greater or lesser extent, owing to the limited depth of penetration of the radiation, and all the more so in the case of thick layers, for which foamed systems are frequently employed.

Moreover, the foaming of the adhesive produces improved technical adhesive properties and performance properties.

The reduction of the drop in bond strength is favored by the high surface quality generated as a result of the pressing of the expanded microballoons back into the polymer matrix during the coating operation.

Moreover, relative to the unfoamed mass having the same polymer basis, the foamed self-adhesive gains additional performance features, such as, for example, improved impact resistance at low temperatures, enhanced bond strength on rough substrates, greater damping and/or sealing properties and conformability of the foam adhesive on uneven substrates, more favorable compression/hardness characteristics, and improved compressibility.

Further elucidation of the characteristic properties and additional functions of the self-adhesives of the invention takes place to some extent in the examples.

A foamed adhesive from the preferred hotmelt adhesive has a smooth, adhering surface, since, during coating, in the roll nip, the expanded microballoons are subsequently pressed back into the polymer matrix, and the adhesive, accordingly, has a preferred surface roughness $R_a$ of less than 10 μm. Determination of surface roughness is appropriate only for adhesive tapes which are based on a very smooth carrier and themselves have a surface roughness $R_a$ of only less than 1 μm. In the case of carriers that are relevant in practice, such as creped papers or nonwovens and woven fabrics, for example, having a greater surface roughness, the determination of the surface roughness of the product is not suitable, accordingly, for describing the advantages of the method.

According to one preferred embodiment of the invention, the fraction of the microballoons in the adhesive is between greater than 0% by weight and 30% by weight, more particularly between 0.5% by weight and 10% by weight.

With further preference, the microballoons at 25° C. have a diameter of 3 μm to 40 μm, more particularly 5 μm to 20 μm, and/or after temperature exposure have a diameter of 20 μm to 200 μm, more particularly 40 μm to 100 μm.

In all existing methods for producing microballoon-foamed adhesive systems, the adhesive develops a rough surface which has little or no adhesion.

With a self-adhesive coated from solvent, bond strength (peel strength) losses of more than 40% can be obtained even starting from a low microballoon content of 0.5% by weight. As the microballoon content goes up, the bond strengths fall further still, and the cohesion is increased.

At a fraction of just 1% by weight of microballoons, the adhesion of the adhesive is already very low.

This is underlined by comparative examples 1.1 and 1.2 and by table 3.

The ratio of the weight per unit volume of the adhesive foamed by the microballoons to the weight per unit volume of the adhesive of identical basis weight and formula, defoamed through the destruction of the cavities formed by the expanded microballoons, is preferably less than 0.9.

This behavior is also shown in the case of solvent-free die coating, in which case the microballoons foam following emergence from the extruder/die, with pressure equalization, and break through the adhesive matrix.

Further encompassed by the concept of the invention is a self-adhesive tape produced with the aid of the adhesive by application of the adhesive to at least one side of a web-formed material. In a double-sidedly adhesive tape, both adhesive coatings may be in accordance with the invention. An alternative provision is for only one of the two coatings to be in accordance with the invention, while the second can be selected arbitrarily (adapted to the tasks to be fulfilled by the adhesive tape).

As carrier material it is preferred to use a film, woven fabric or paper, to which the (self-)adhesive is applied on one side.

Furthermore, preferably, the (self-)adhesive is applied to a release paper or release film, producing a carrier-less adhesive tape, also referred to for short as a tab.

The thickness of the adhesive in an adhesive tape on the web-formed carrier material may be between 20 μm and 3000 μm, preferably between 40 μm and 150 μm.

Furthermore, the adhesive may be applied in a thickness of 20 μm to 3000 μm to a release material, if the layer of adhesive, more particularly after crosslinking, is to be used as a carrierless, double-sided self-adhesive tape.

Experimental Investigations

The following test methods are employed in order to determine the stated measurement values, in the examples as well.

Test Methods

Determination of Surface Roughness

The PRIMOS system consists of an illumination unit and a recording unit.

The illumination unit, with the aid of a digital micromirror projector, projects lines onto the surface. These projected parallel lines are diverted or modulated by the surface structure.

The modulated lines are recorded using a CCD camera arranged at a defined angle, referred to as the triangulation angle.

Size of measuring field: 14.5×23.4 mm$^2$
Profile length: 20.0 mm
Areal roughness: 1.0 mm from the edge (Xm=21.4 mm; Ym=12.5 mm)
Filtering: 3rd order polynomial filter
Measuring instruments of this kind can be purchased from companies including GFMesstechnik GmbH at Teltow.
Peel Strength (Bond Strength) BS The peel strength (bond strength) was tested in a method based on PSTC-1.

A strip of the (self-)adhesive tape under investigation is adhered in a defined width (standard: 20 mm) to a ground steel plate or to another desired adhesion/test substrate such as, for example, polyethylene or polycarbonate, etc., by rolling over it ten times using a 5 kg steel roller. Double-sided adhesive tapes are reinforced on the reverse side with an unplasticized PVC film 36 μm thick. Thus prepared, the plate is clamped into the testing instrument, the adhesive strip is peeled from its free end on a tensile testing machine at a peel angle of 180° and at a speed of 300 mm/min, and the force needed to accomplish this is measured. The results are reported in N/cm and are averaged over three measurements. All measurements are conducted in a controlled-climate room at 23° C. and 50% relative humidity.

Quantitative Determination of Shear Strength: Static Shear Test HP

An adhesive tape is applied to a defined, rigid adhesion substrate (in this case steel) and subjected to a constant shearing load. The holding time in minutes is measured. A suitable plate suspension system (angle 179±1°) ensures that the adhesive tape does not peel from the bottom edge of the plate.

The test is intended primarily to yield information on the cohesiveness of the composition. This is only the case, however, when the weight and temperature parameters are chosen such that cohesive failure does in fact occur during the test. Otherwise, the test provides information on the adhesion to the substrate or on a combination of adhesion and cohesiveness of the composition.

A strip, 13 mm wide, of the adhesive tape under test is adhered to a polished steel plaque (test substrate) over a length of 5 cm by rolling over it ten times using a 2 kg roller. Double-sided adhesive tapes are lined on the reverse side with a 50 μm aluminum foil and thus reinforced. Subsequently a belt loop is mounted on the bottom end of the adhesive tape. A nut and bolt is then used to fasten an adapter plaque to the facing side of the shear test plate, in order to ensure the specified angle of 179±1°.

The time for development of strength, between roller application and loading, should be between 10 and 15 minutes.

The weights are subsequently hung on smoothly using the belt loop.

An automatic clock counter then determines the point in time at which the test specimens shear off.

Density
Density Determination by Pycnometer:

The principle of the measurement is based on the displacement of the liquid located within the pycnometer. First, the empty pycnometer or the pycnometer filled with liquid is weighed, and then the body to be measured is placed into the vessel.

The density of the body is calculated from the differences in weight:

Let $m_0$ be the mass of the empty pycnometer, $m_1$ the mass of the pycnometer filled with water, $m_2$ the mass of the pycnometer with the solid body, $m_3$ the mass of the pycnometer with the solid body, filled up with water, $\rho_W$ the density of the water at the corresponding temperature, $\rho_F$ the density of the solid body;

the density of the solid body is then given by:

$$\rho_F = \frac{(m_2 - m_0)}{(m_1 - m_0) - (m_3 - m_2)} \cdot \rho_W$$

One triplicate determination is carried out for each specimen.

Quick Method for Density Determination from the Coatweight and Film Thickness:

The weight per unit volume or density of a coated self-adhesive is determined via the ratio of the basis weight to the respective film thickness:

$$\rho = \frac{m}{V} = \frac{MA}{d}$$

$$[\rho] = \frac{[kg]}{[m^2] \cdot [m]} = \left[\frac{kg}{m^3}\right]$$

MA=coatweight/basis weight (excluding liner weight) in $[kg/m^2]$ d=film thickness (excluding liner thickness) in [m]

Basis of the Examples

The invention is elucidated in more detail below, with reference to comparative examples and to inventive examples, without thereby wishing to impose any restriction on the subject matter of the invention.

Comparative examples 1.1. and 1.2. below show the advantages of the foaming of a self-adhesive by the inventive hotmelt method as opposed to foaming from solvent.

The advantages resulting from the method of the invention can be demonstrated most simply on a completed, foamed self-adhesive tape, as shown in the additional comparative example 2.

For the sake of brevity, in the examples, the term "hotmelt" is equated with the term "hotmelt process", as a method according to the invention.

Raw Materials Used:

The raw materials used in the subsequent examples were as follows:

TABLE 1

Raw materials used

| Trade name | Raw material/UPAC | Manufacturer/supplier |
|---|---|---|
| Voranol P 400 ® | Polypropylene glycol, diol | Dow |
| Voranol 2000L ® | Polypropylene glycol, diol | Dow |
| Voranol CP 6055 ® | Polypropylene glycol, triol | Dow |
| MPDiol ® | 2-Methyl-1,3-propanediol | Lyondell |
| Vestanat IPDI ® | Isophorone diisocyanate | Degussa |
| Desmodur N 3300 ® | Aliphatic polyisocyanate based on hexamethylene diisocyanate | Bayer |
| Tinuvin 292 ® | Sterically hindered amine, light stabilizer and aging inhibitor | Ciba |
| Tinuvin 400 ® | Triazine derivative, UV protectant | Ciba |
| Coscat 83 ® | Bismuth trisneodecanoate CAS No. 34364-26-6 | Caschem |
| Aerosil R 202 ® | Fumed silica, hydrophobized | Evonik |
| n-Butyl acrylate | Acrylic acid n-butyl ester | Rohm & Haas |
| Acrylic acid, pure | Acrylic acid | BASF |
| N-tert-Butylacrylamide | N-(1,1-Dimethylethyl)-2-propenamide | Linz Chemie |
| 2-Ethylhexyl acrylate | 2-Ethylhexyl acrylate | Brenntag |
| Bisomer HEMA | 2-Hydroxyethyl methacrylate | IMCD Deutschland |
| Methyl acrylate | Acrylic acid, methyl ester | BASF |
| Maleic anhydride | 2,5-Dihydro-2,5-furandione, MAA | Condea-Huntsman |
| Expancel 051 DU 40 ® | Microballoons (MB) | Expancel Nobel Industries |

Base Formulas of the Ready-Prepared Base Masses:

| Adhesive K | Preparation H | Raw materials | Fraction [% by weight] |
|---|---|---|---|
| K1 | H1 | n-Butyl acrylate | 44.2 |
| | | 2-Ethylhexyl acrylate | 44.7 |
| | | Methyl acrylate | 8.6 |
| | | Acrylic acid, pure | 1.5 |
| | | Bisomer HEMA | 1.0 |
| K2 | H1 | n-Butyl acrylate | 44.9 |
| | | 2-Ethylhexyl acrylate | 44.9 |
| | | N-tert-Butylacrylamide | 6.2 |
| | | Acrylic acid, pure | 3.0 |
| | | Maleic anhydride | 1.0 |
| K3 | H2 | Voranol P400 | 17.23 |
| | | Voranol CP 6055 | 48.88 |
| | | MP Diol | 3.60 |
| | | Voranol 2000L | 8.09 |
| | | Tinuvin 400 | 0.21 |
| | | Tinuvin 292 | 0.10 |

| Adhesive K | Preparation H | Raw materials | Fraction [% by weight] |
|---|---|---|---|
| | | Coscat 83 | 0.41 |
| | | Aerosil R202 | 2.06 |
| | | Vestanat IPDI | 19.42 |

Preparation Variants of the Ready-Prepared Base Masses:

Preparation H1:

The above monomer mixtures (amounts in % by weight) are copolymerized in solution. The polymerization batches consist of 60% by weight of the monomer mixtures and 40% by weight of solvents (such as benzine 60/95 and acetone). The solutions are first freed from oxygen by flushing with nitrogen in customary reaction vessels made of glass or steel (with reflux condenser, stirrer, temperature measurement unit and gas inlet tube) and then heated to boiling.

Polymerization is initiated by addition of 0.2% to 0.4% by weight of a customary radical polymerization initiator such as dibenzene peroxide, dilauroyl peroxide or azobisisobutyronitrile.

During the polymerization time of approximately 20 hours, dilution may take place a number of times with further solvent, depending on viscosity, and so the completed polymer solutions have a solids content of 35% to 55% by weight.

Concentration is accomplished by lowering the pressure and/or raising the temperature.

Preparation H2:

The branched, thermoplastically processable, hydroxyl-functionalized polyurethane hotmelt prepolymer was prepared by homogeneously mixing and hence reacting the stated starting materials in the stated proportions:

First of all, all of the starting materials listed, apart from the MP Diol and the Vestanat IPDI, were mixed at a temperature of 70° C. and a pressure of 100 mbar for 1.5 hours. Then the MP Diol was mixed in over 15 minutes, followed by the Vestanat IPDI, likewise over a period of 15 minutes. The resultant heat of reaction caused the mixture to heat to 100° C., and part of the mixture was then dispensed into storage vessels. Another part was processed further directly in substep B).

The resulting prepolymer was solid at room temperature. The complex viscosity $\eta^*$ at room temperature (23° C.) was 22 000 Pas and at 70° C. was 5500 Pas.

The weight-averaged average molecular weight $M_w$ was 125 000 g/mol; the number-averaged average molecular weight $M_N$ was 17 800 g/mol.

Formulas of the Inventive Foamed Mass Systems Based on the Ready-Prepared Base Masses K:

| Experimental specimen S | Base adhesive K | Additives | Fraction of the additives [% by weight] | According to inventive preparation process |
|---|---|---|---|---|
| S1 | K1 | Polypox R16 | 0.01 | V1 |
| | | Epikure 925 | 0.1 | |
| | | Expancel 051 DU 40 | 3 | |
| S2 | K1 | Polypox R16 | 0.01 | V1 |
| | | Epikure 925 | 0.1 | |
| | | Expancel 051 DU 40 | 5 | |
| S3 | K1 | Polypox R16 | 0.01 | V1 |
| | | Epikure 925 | 0.1 | |
| | | Expancel 051 DU 40 | 8 | |
| S4 | K2 | Polypox R16 | 0.01 | V1 |
| | | Epikure 925 | 0.1 | |
| | | Expancel 051 DU 40 | 5.6 | |
| S5 | K2 | Polypox R16 | 0.01 | V1 |
| | | Epikure 925 | 0.1 | |
| | | Expancel 051 DU 40 | 5.6 | |
| | | Dertophene T110 | 10 | |
| S6 | K2 | Polypox R16 | 0.01 | V1 |
| | | Epikure 925 | 0.1 | |
| | | Expancel 051 DU 40 | 5.6 | |
| | | Dertophene T110 | 20 | |
| S7 | K2 | Polypox R16 | 0.013 | V1 |
| | | Epikure 925 | 0.13 | |
| S8 | K2 | Polypox R16 | 0.005 | V2 |
| | | Epikure 925 | 0.05 | |
| | | Expancel 051 DU 40 | 1 | |
| S9 | K2 | Polypox R16 | 0.013 | V1 |
| | | Epikure 925 | 0.13 | |
| | | Sylvares TP115 | 25 | |
| S10 | K2 | Porypox R16 | 0.005 | V2 |
| | | Epikure 925 | 0.05 | |
| | | Expancel 051 DU 40 | 1 | |
| | | Sylvares TP115 | 10 | |
| S11 | K3 | Coscat 83 | 0.41 | V1 |
| | | Expancel 051 DU 40 | 3 | |
| S12 | K3 | Coscat 83 | 0.41 | V1 |
| | | Expancel 051 DU 40 | 5 | |
| S13 | K3 | Coscat 83 | 0.41 | V1 |
| | | Expancel 051 DU 40 | 8 | |
| S14 | K3 | Coscat 83 | 0.41 | V1 |

Inventive Preparation Processes V:

Process V1:

Preparation takes place as described in the disclosure relating to FIG. 1.

The temperature profiles and machine parameters are adapted to the mass system under preparation, such as the polymer matrix to be compounded, the crosslinking system, the microballoon type and/or further additives and fillers of any kind, and are given in detail in the examples.

Process V2:

Preparation takes place as described in the disclosure relating to FIG. 2.

The temperature profiles and machine parameters are adapted to the mass system under preparation, such as the polymer matrix to be compounded, the crosslinking system, the microballoon type and/or further additives and fillers of any kind, and are given in detail in the examples.

EXAMPLES

Example 1

Graduated Microballoon Contents with the Same Mass Basis

| Experimental specimen | Coatweight [g/m²] | Film thickness [µm] | Density [kg/m³] | BS steel 90° 3d peel increase [N/cm] | HP RT 10N [min] | HP 70° C. 10N [min] |
|---|---|---|---|---|---|---|
| S1 | 498 | 873 | 570 | 13.4 | 1524 | 40 |
| S2 | 458 | 953 | 481 | 14.9 | 4722 | 149 |
| S3 | 378 | 1048 | 361 | 11.7 | >10 000 | 702 |

Example 2

Graduated Resin Contents with the Same Mass Basis and Constant Microballoon Content

| Experimental specimen | Coatweight [g/m²] | Film thickness [µm] | Density [kg/m³] | BS steel 90° 3d peel increase [N/cm] | HP RT 10N [min] | HP 70° C. 10N [min] |
|---|---|---|---|---|---|---|
| S4 | 606 | 1030 | 588 | 8.7 | 2210 | 21 |
| S5 | 438 | 1038 | 422 | >17.6 | >10 000 | 76 |
| S6 | 404 | 1010 | 400 | >22.1 | >10 000 | 399 |

Example 3

Comparison Unfoamed/Foamed Resin-Free/Resin-Containing

| Experimental specimen | Coatweight [g/m²] | Film thickness [µm] | Density [kg/m³] | BS steel 90° 3d peel increase [N/cm] | HP RT 10N [min] | HP 70° C. 10N [min] |
|---|---|---|---|---|---|---|
| S7 | 994 | 915 | 1086 | 13.8 | 325 | 13 |
| S8 | 563 | 955 | 589 | 24.1 | 1386 | 105 |
| S9 | 954 | 910 | 1048 | 18.9 | 831 | 30 |
| S10 | 614 | 955 | 643 | 23.9 | >3000 | 25 |

Specimens S7 and S9 in accordance with process 1, since unfoamed mass requires subsequent degassing. Foamed mass, in contrast, does not, and so specimens S8 and S10 prepared by process 2.

Example 4

Polyurethane Masses with Graduated Microballoon Content

| Experimental specimen | Coatweight [g/m²] | Film thickness [µm] | Density [kg/m³] | BS steel 90° 3d peel increase [N/cm] | HP RT 10N [min] | HP 70° C. 10N [min] |
|---|---|---|---|---|---|---|
| S11 | 547 | 1010 | 542 | 24.4 | 492 | 3 |
| S12 | 402 | 990 | 406 | >21.4 | 1723 | 14 |
| S13 | 397 | 1073 | 370 | >29.7 | 1125 | 9 |

Example 5

Experimental Specimens S11 to S14 Subsequently Laminated on Both Sides with 50 g/m² of Aftercoat Mass Three-Layer Construction

| Experimental specimen | Coatweight [g/m²] | Film thickness [µm] | Density [kg/m³] | BS steel 90° 3d peel increase [N/cm] | HP RT 10 N [min] |
|---|---|---|---|---|---|
| S11 + 50 g/m² | 647 | 1110 | 583 | 29.2 | 782 |
| S12 + 50 g/m² | 502 | 1090 | 461 | 42.7 | 2336 |
| S13 + 50 g/m² | 497 | 1173 | 424 | 34.2 | 911 |
| S14 + 50 g/m² | 1150 | 1045 | 1100 | 20.8 | 150 |

The invention claimed is:

1. A method for producing a self-adhesive, comprising:
   foaming a mass system comprising unexpanded microballoons at a first temperature, thereby forming a foamed mass system;
   mixing crosslinker substances into the foamed mass system at a second temperature, which is lower than the first temperature, thereby forming a blended mass system; and
   shaping the blended mass system to form a layer, thereby forming a self-adhesive,
   wherein the crosslinker substances are crosslinker substances for thermal crosslinking of the foamed mass system.

2. The method of claim 1, wherein the first temperature is equal to or above an expansion temperature of the unexpanded microballoons and the second temperature is below the expansion temperature.

3. The method of claim 1, wherein:
   in a first mixing assembly expandable microballoons and optionally further additives are introduced into a first mass system, thereby forming a second mass system;
   the second mass system is heated under superatmospheric pressure to a temperature which at least corresponds to, and is optionally higher than, an expansion temperature of the expandable microballoons under atmospheric pressure;
   the expandable microballoons are expanded on emergence from the first mixing assembly, thereby forming a third mass system;

the third mass system is introduced into a second mixing assembly, whereby the third mass system is at a temperature below the expansion temperature of the unexpanded microballoons;

the crosslinker substances are added to the second mixing assembly, thereby forming a fourth mass system; and the fourth mass system is shaped.

4. The method of claim 1, wherein:

in a first mixing assembly expandable microballoons and optionally further additives are introduced into a first mass system, thereby forming a second mass system;

the first mixing assembly comprises a first mixing zone and a second mixing zone;

the second mass system is heated under superatmospheric pressure in the first mixing zone to a temperature which is equal to or higher than an expansion temperature of the expandable microballoons under atmospheric pressure, thereby forming a third mass system;

the third mass system is transferred from the first mixing zone into the second mixing zone;

the third mass system in the second mixing zone is at a temperature below the expansion temperature of the expandable microballoons;

the crosslinker substances are added during transfer of the third mass system to the second mixing zone and/or after transfer of the third mass system to the second mixing zone, thereby forming a fourth mass system; and the fourth mass system is shaped.

5. The method of claim 1, wherein the self-adhesive is applied to a web-form carrier or a release material.

6. The method of claim 1, wherein thermal crosslinking takes place after shaping.

7. The method of claim 1, wherein the foamed mass system is in a noncrosslinked state.

8. A self-adhesive produced by the method of claim 1.

9. A self-adhesive for a single or double-sided self-adhesive tape comprising the self-adhesive of claim 8.

* * * * *